United States Patent
Zheng et al.

(10) Patent No.: US 8,643,303 B2
(45) Date of Patent: *Feb. 4, 2014

(54) ADAPTIVE DIMMER DETECTION AND CONTROL FOR LED LAMP

(75) Inventors: Junjie Zheng, Santa Clara, CA (US);
John W. Kesterson, Seaside, CA (US);
Richard M. Myers, Grass Valley, CA (US); Baorong Chen, Shenzhen (CN);
Gordon Chen, Fremont, CA (US)

(73) Assignee: iWatt Inc., Campbell, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/495,918

(22) Filed: Jun. 13, 2012

(65) Prior Publication Data

US 2012/0274227 A1  Nov. 1, 2012

Related U.S. Application Data

(63) Continuation of application No. 12/503,063, filed on Jul. 14, 2009, now Pat. No. 8,222,832.

(51) Int. Cl.
*H05B 37/02* (2006.01)

(52) U.S. Cl.
USPC .............................. 315/291; 315/307; 315/308

(58) Field of Classification Search
USPC .......... 315/185 R, 209 R, 224, 225, 291, 307, 315/308, 312
See application file for complete search history.

(56) References Cited

U.S. PATENT DOCUMENTS

| | | | | |
|---|---|---|---|---|
| 7,852,017 | B1 * | 12/2010 | Melanson | 315/291 |
| 8,018,172 | B2 * | 9/2011 | Leshniak | 315/194 |
| 8,222,832 | B2 * | 7/2012 | Zheng et al. | 315/291 |

FOREIGN PATENT DOCUMENTS

CN  1719959  1/2006

OTHER PUBLICATIONS

State Intellectual Property Office of the People's Republic of China, First Office Action, Chinese Patent Application No. 201010229572. 9, Feb. 5, 2013, twelve pages.
Korean Intellectual Property Office, Office Action, Korean Patent Application No. 10-2012-7002127, May 22, 2013, ten pages.
State Intellectual Property Office of the People's Republic of China, Second Office Action, Chinese Patent Application No. 201010229572.9, Oct. 15, 2013, six pages.
Korean Intellectual Patent Office, Office Action, Korean Patent Application No. 10-2012-7002127, Nov. 25, 2013, eight pages.

* cited by examiner

*Primary Examiner* — Jimmy Vu
(74) *Attorney, Agent, or Firm* — Fenwick & West LLP

(57) ABSTRACT

An LED lamp is provided in which the output light intensity of the LEDs in the LED lamp is adjusted based on the input voltage to the LED lamp. A dimmer control unit detects a type of dimmer switch during a configuration process. Using the detected dimmer type, the dimmer control unit generates control signals appropriate for the detected dimmer type to provide regulated current to the LEDs and to achieve the desired dimming effect. The LED lamp can be a direct replacement of conventional incandescent lamps in typical wiring configurations found in residential and commercial building lighting applications that use conventional dimmer switches.

25 Claims, 10 Drawing Sheets

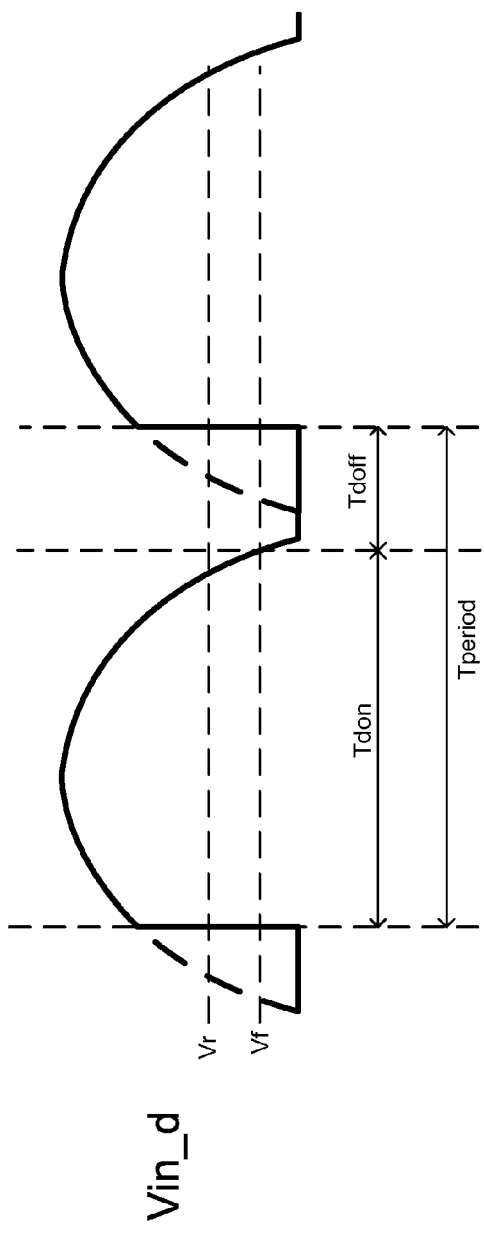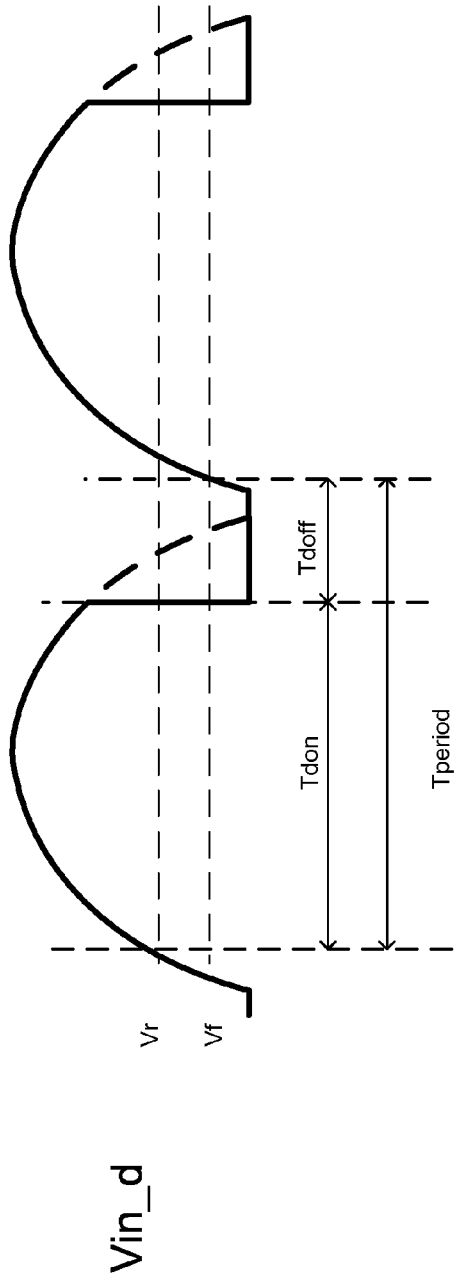

ably converting the input voltage into a DC output voltage. Combining the functions of the phase detector and chop generator, the dimmer control unit controls both detection of dimmer type and generation of the chopping control signal in an adaptive manner that accommodates both leading edge and trailing edge dimmers.

ADAPTIVE DIMMER DETECTION AND CONTROL FOR LED LAMP

CROSS-REFERENCE TO RELATED APPLICATIONS

This application is a continuation of, and claims priority under 35 U.S.C. §120 from, U.S. patent application Ser. No. 12/503,063, entitled "Adaptive Dimmer Detection and Control for LED Lamp," filed on Jul. 14, 2009, which is incorporated by reference herein in its entirety.

BACKGROUND OF THE INVENTION

1. Field of the Invention

The present invention relates to driving LED (Light-Emitting Diode) lamps and, more specifically, to dimming the LED lamps.

2. Description of the Related Arts

LEDs are being adopted in a wide variety of electronics applications, for example, architectural lighting, automotive head and tail lights, backlights for liquid crystal display devices, flashlights, etc. Compared to conventional lighting sources such as incandescent lamps and fluorescent lamps, LEDs have significant advantages, including high efficiency, good directionality, color stability, high reliability, long life time, small size, and environmental safety.

The use of LEDs in lighting applications is expected to expand, as they provide significant advantages over incandescent lamps (light bulbs) in power efficiency (lumens per watt) and spectral quality. Furthermore, LED lamps represent lower environmental impact compared to fluorescent lighting systems (fluorescent ballast combined with fluorescent lamp) that may cause mercury contamination as a result of fluorescent lamp disposal.

However, conventional LED lamps cannot be direct replacements of incandescent lamps and dimmable fluorescent systems without modifications to current wiring and component infrastructure that have been built around incandescent light bulbs. This is because conventional incandescent lamps are voltage driven devices, while LEDs are current driven devices, requiring different techniques for controlling the intensity of their respective light outputs.

FIG. 1 illustrates a typical dimmer wiring configuration in conventional residential and commercial lighting applications. Predominantly, incandescent lamps operate off of alternating current (AC) systems. Specifically, a dimmer switch 10 is placed in series with an input voltage source 15 and the incandescent lamp 20. The dimmer switch 10 receives a dimming input signal 25, which sets the desired light output intensity of incandescent lamp 20. Control of light intensity of the incandescent lamp 20 is achieved by adjusting the RMS voltage value of the lamp input voltage (V-RMS) 30 that is applied to incandescent lamp 20. Dimming input signal 25 can either be provided manually (via a knob or slider switch) or via an automated lighting control system.

Many dimmer switches adjust the V-RMS by controlling the phase angle of the AC-input power that is applied to the incandescent lamp to dim the incandescent lamp. FIGS. 2A, 2B, and 2C illustrate typical lamp input voltage waveforms which are output to incandescent lamp 20. FIG. 2A illustrates a typical lamp input voltage waveform 30 when no dimming switch 10 is present, or when the dimmer switch 10 is set to maximum light intensity and the voltage signal from the input voltage source 15 is unaffected by the dimmer switch 10. FIG. 2B illustrates lamp input voltage 30 with a dimming effect based on leading edge phase angle modulation (i.e. a leading edge dimmer). In a leading edge dimmer, the dimmer switch 10 eliminates a section 32 having a period Td_off of the lamp input voltage 30 after the zero-crossings of the AC half-cycles and before the peaks. The input voltage 30 is unchanged during the period Td_on. As the dimming input signal 25 increases the desired dimming effect, the period Td_off of the eliminated section 32 increases, the period Td_on decreases, and the output light intensity decreases. For minimum dimming (maximum light intensity), the period Td_off of the eliminated section 32 becomes very small or zero.

FIG. 2C illustrates lamp input voltage 30 with a dimming effect based on trailing edge phase angle modulation (i.e. a trailing edge dimmer). Trailing edge dimmer switches operate by removing trailing portions 34 of AC voltage half-cycles, after peaks and before zero-crossings. The input voltage 30 is unchanged during the period Td_on. Again, as the dimming input signal 25 increases the desired dimming effect, the period Td_off of the removed sections 34 increases, the period Td_on decreases, and the light intensity decreases. For minimum dimming (maximum light intensity) the period Td_off of the eliminated section 34 becomes very small or zero.

Controlling the phase angle is a very effective and simple way to adjust the RMS-voltage supplied to the incandescent bulb and provide dimming capabilities. However, conventional dimmer switches that control the phase angle of the input voltage are not compatible with conventional LED lamps, since LEDs, and thus LED lamps, are current driven devices.

One solution to this compatibility problem uses an LED driver that senses the lamp input voltage 30 to determine the operating duty cycle of the dimmer switch 10 and reduces the regulated forward current through an LED lamp as the operating duty cycle of the dimmer switch 10 is lowered. However, the control methods employed in these conventional solutions are compatible with only a single type of dimming switch, e.g., leading edge or trailing edge. If an LED lamp designed for use with a leading edge dimmer switch is connected to a lamp input voltage 30 using a trailing edge dimmer switch or vice versa, the LED lamp will likely malfunction and/or fail.

SUMMARY OF THE INVENTION

In a first aspect of the present invention, embodiments comprise a light-emitting diode (LED) lamp having one or more LEDs, a dimmer control unit, and a power converter. The dimmer control determines a type of dimmer switch providing an input voltage, determines a detected dimming amount of the input voltage for the detected type of dimmer, and generates one or more control signals to control regulated current through the LEDs such that an output light intensity of the LEDs is proportional to the detected dimming amount. The power converter receives the control signals and provides regulated current to the LEDs. The power converter adjusts the regulated current to the LEDs as indicated by the control signals to achieve the output light intensity proportional to the detected dimming amount.

In one embodiment, the dimmer control unit comprises a phase detector that determines a detected phase angle modulation of the input voltage representative of the detected dimming amount. The phase detector uses the detected dimmer type to determine threshold values and compares the threshold values to the input voltage to determine the phase angle modulation. A chop generator circuit uses the detected phase angle modulation to generate a chopping control signal that controls switching of a chopping circuit for efficiently providing supply power to the power converter. A dimming controller uses the detected phase angle modulation to generate control signals for controlling switching of the power converter to achieve the desired dimming effect.

In a second aspect of the present invention, a method determines a type of dimmer switch coupled to the LED lamp. In a first detection stage, a dimmer type detector receives a lamp input voltage and computes a maximum derivative of the lamp input voltage that occurred during a previous cycle. The dimmer type detector also computes a first threshold value. If the maximum derivative exceeds the first threshold value, the dimmer type detector determines that the input voltage is outputted from a leading edge dimmer switch. If the threshold is not exceeded, the dimmer type detector determines a time period during which the lamp input voltage remains below a trailing edge threshold value. The dimmer type detector determines that the input voltage is outputted from a trailing edge dimmer switch responsive to the time period exceeding a predefined time threshold. Otherwise, the dimmer type detector determines that the input voltage is not outputted from a dimmer switch.

In one embodiment, a second detection stage is performed a number of cycles after the first detection stage. If the results of the first and second detection stages do not match, a third detection stage is performed after another number of cycles. If the results from the second and third detection stages match, then the dimmer type is set to match the results from the second and third stages. If the results do not match, the dimmer type detector outputs a signal indicative of an unsupported dimmer type.

The LED lamp according to various embodiments of the present invention has the advantage that the LED lamp can be a direct replacement of conventional incandescent lamps in typical wiring configurations found in residential and commercial building lighting applications, and that the LED lamp can be used with conventional dimmer switches that carry out dimming by changing the input voltage.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of the embodiments of the present invention can be readily understood by considering the following detailed description in conjunction with the accompanying drawings.

FIGS. 10A and 10B illustrate waveforms showing the detected period and on-time of a lamp input voltage according to one embodiment of the present invention.

DETAILED DESCRIPTION OF EMBODIMENTS

The Figures (FIG.) and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention.

Reference will now be made in detail to several embodiments of the present invention(s), examples of which are illustrated in the accompanying figures. It is noted that wherever practicable similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

As will be explained in more detail below with reference to the figures, the LED lamp system and a method according to various embodiments of the present invention (1) detects an input voltage from a dimming circuit and determines the type of dimming system (i.e., leading edge dimmer, trailing edge dimmer, no dimmer, or unsupported dimmer); (2) generates dimming control signals based on the input voltage and the determined dimming type; and (3) provides corresponding output drive current to the LEDs in the LED lamp based on the dimming control signals to achieve the desired light intensity of the LEDs. In addition, the LED lamp system may go into a "safe mode" when the system is unable to identify the type of dimming system, or when the detected dimming type is unsupported. Thus the LED lamp beneficially detects the type of dimming switch employed, and adjust its control to be compatible with the detected dimming type such that the LED lamp can directly replace an incandescent lamp in a typical wiring configuration.

Figure 1:
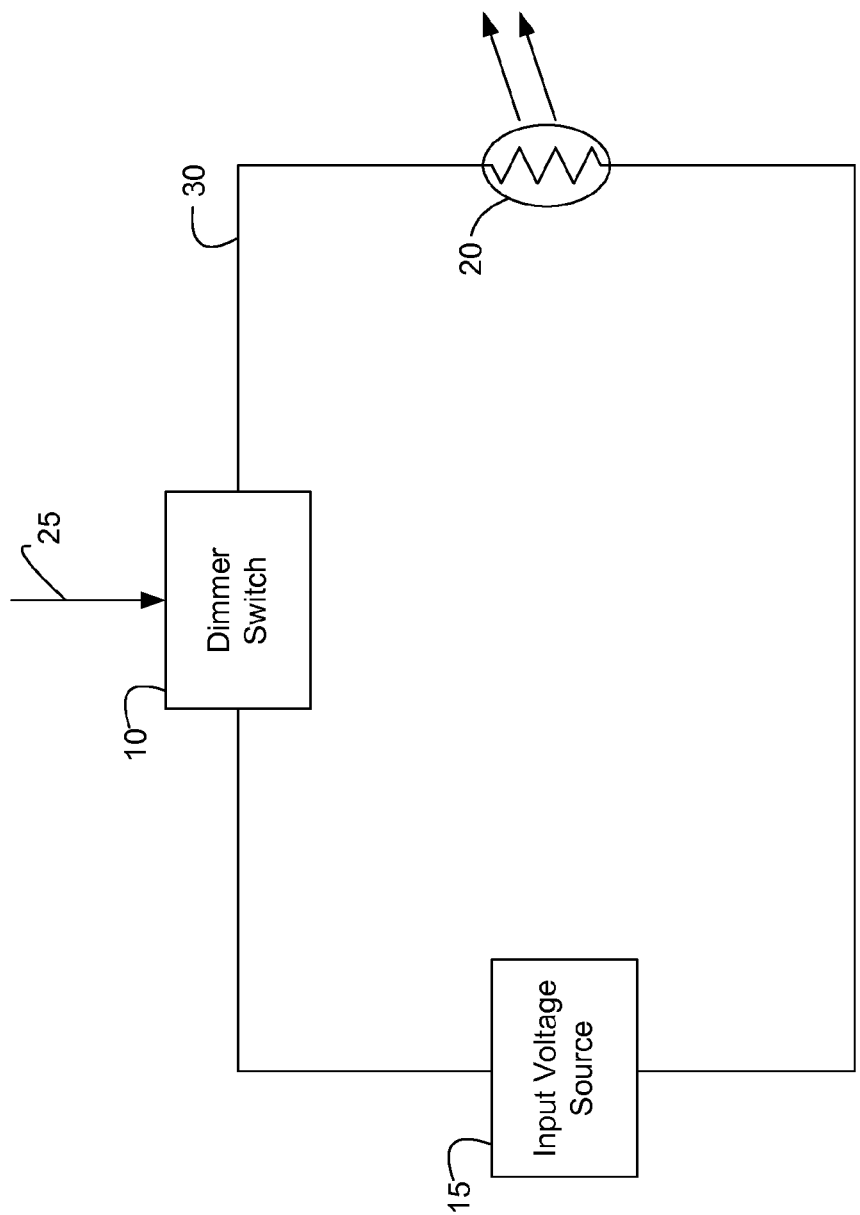
FIG. 1 illustrates a typical dimmer wiring configuration in conventional residential and commercial lighting applications.
Figure 2:
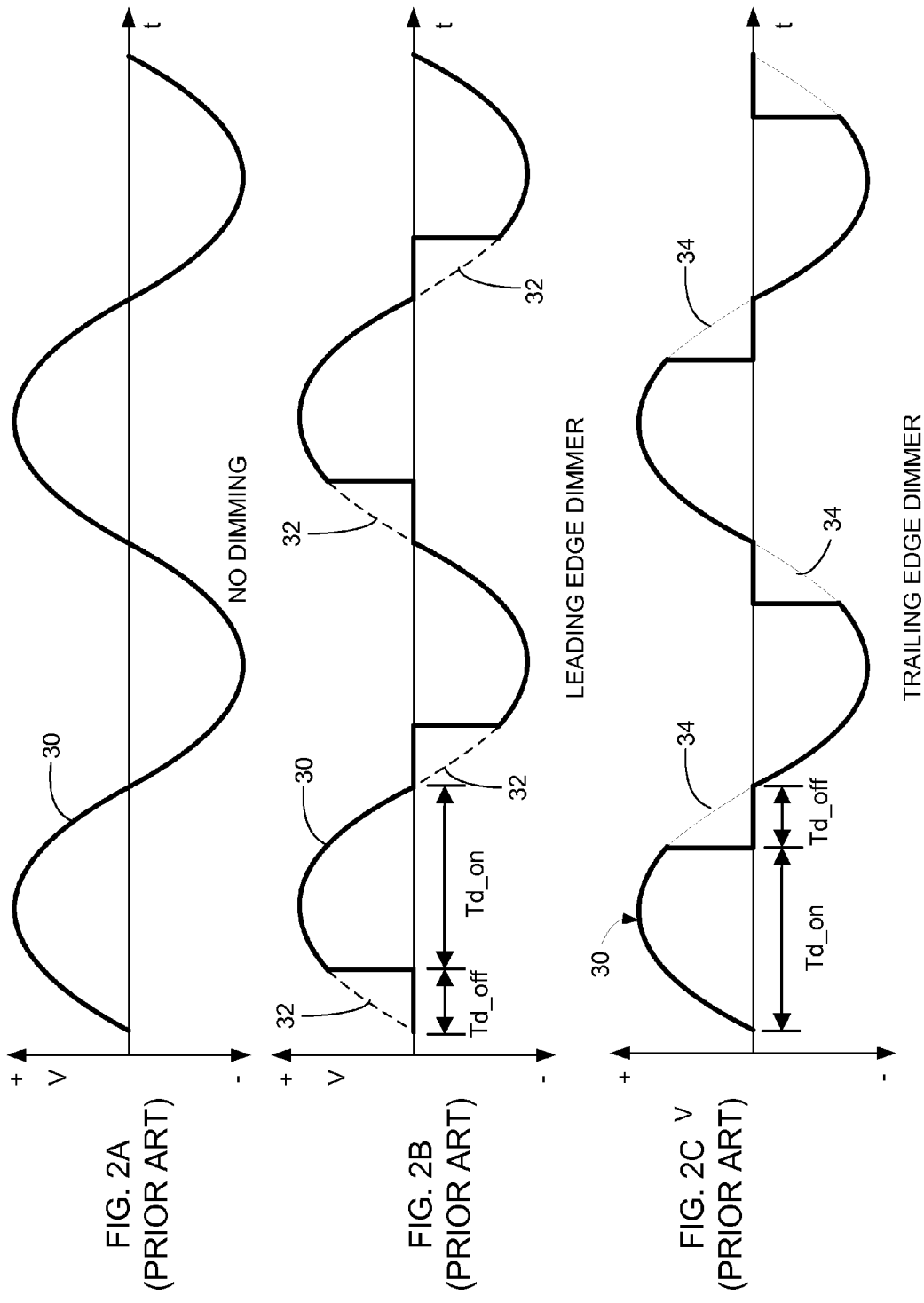
FIGS. 2A, 2B, and 2C illustrate typical lamp input voltage waveforms which are output by different types of dimming switches.
Figure 3:
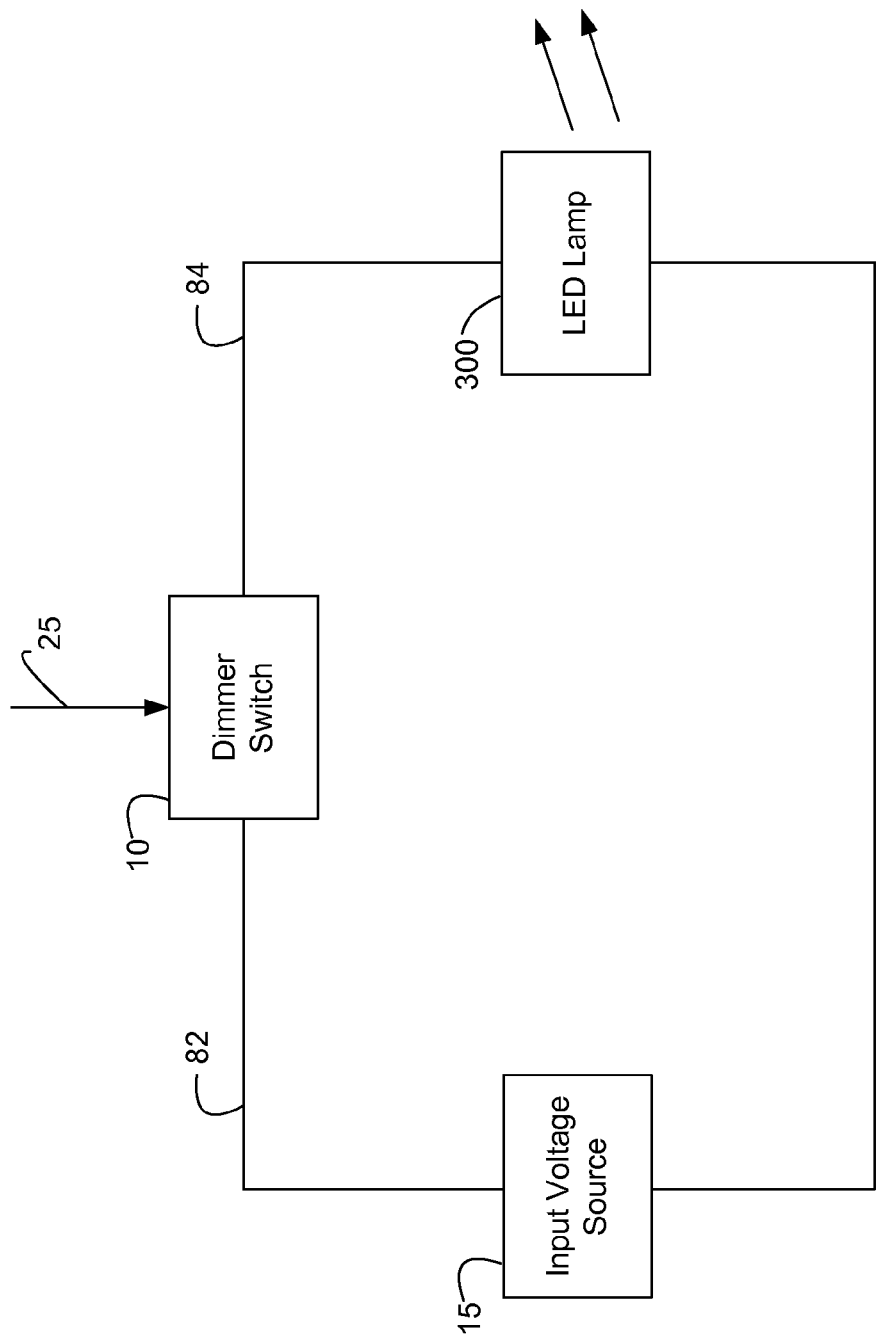
FIG. 3 illustrates an LED lamp system including an LED lamp according to one embodiment of the present invention, used with a conventional dimmer switch.

FIG. 3 illustrates an LED lamp system including LED lamp 300 used with a conventional dimmer switch 10. LED lamp 300 according to various embodiments of the present invention is a direct replacement of an incandescent lamp 20 in a conventional dimmer switch setting, such as the setting of FIG. 1. A dimmer switch 10 is placed in series with AC input voltage source 15 and LED lamp 300. Dimmer switch 10 is a conventional one, an example of which will be described in more detail below with reference to FIG. 4. Dimmer switch 10 receives a dimming input signal 25, which is used to set the desired light output intensity of LED lamp 300. Dimmer switch 10 receives AC input voltage signal 82 and adjusts the V-RMS value of lamp input voltage 84 in response to dimming input signal 25. In other words, control of the light intensity outputted by LED lamp 300 by dimmer switch 10 is achieved by adjusting the V-RMS value of the lamp input voltage 84 that is applied to LED lamp 300, in a conventional manner. The LED lamp 300 controls the light output intensity of LED lamp 300 to vary proportionally to the lamp input voltage 84, exhibiting behavior similar to incandescent lamps, even though LEDs are current-driven devices and not voltage driven devices. Furthermore, LED lamp 300 can detect the type of dimmer switch 10 (e.g., leading edge, trailing edge, no dimmer, or unsupported dimmer) and adjust internal controls so that LED lamp 300 is compatible with the detected type. Dimming input signal 25 can either be provided manually (via a knob or slider switch, not shown herein) or via an automated lighting control system (not shown herein).

Dimmer Switch

Figure 4:
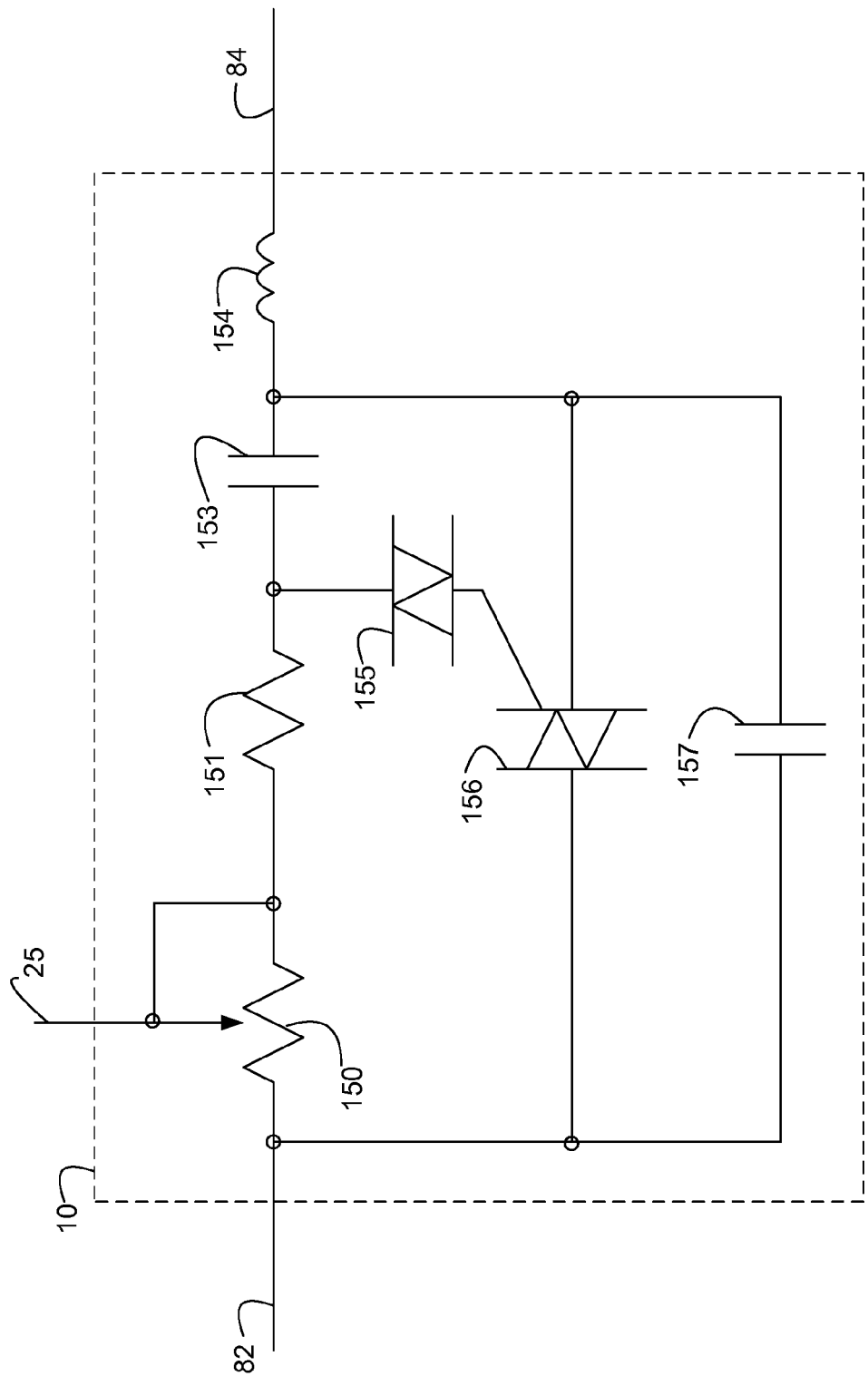
FIG. 4 illustrates a circuit of a conventional dimmer switch.

FIG. 4 illustrates the circuit of a conventional dimmer switch 10 for use with the present invention. Although FIG. 4 illustrates dimmer switch 10 as a leading edge type of dimmer, alternative embodiments may include a dimmer switch 10 of a different type, (e.g., a trailing edge dimmer), or may not have any dimmer switch 10 present. Dimmer switch 10 includes components such as potentiometer resistor (variable resistor) 150, resistor 151, capacitors 153, 157, diac 155, triac 156, and inductor 154.

Triac 156 is triggered relative to the zero crossings of the AC input voltage 82. When the triac 156 is triggered, it keeps conducting until the current passing though triac 156 goes to zero at the next zero crossing if its load is purely resistive, like a light bulb. By changing the phase at which triac 156 is triggered, the duty cycle of the lamp input voltage 84 can be changed. The advantage of triacs over simple variable resistors is that they dissipate very little power as they are either fully on or fully off. Typically triacs cause a voltage drop of 1-1.5 V when it passes the load current.

The purpose of potentiometer 150 and delay capacitor 153 in a diac 155/triac 156 combination is to delay the firing point of diac 155 from the zero crossing. The larger the resistance potentiometer 150 plus resistor 151 feeding delay capacitor 153, the longer it takes for the voltage across capacitor 153 to rise to the point where diac 155 fires, turning on triac 156. Filter capacitor 157 and inductor 154 make a simple radio frequency interference filter, without which the circuit would generate much interference because firing of triac 156 in the middle of the AC phase causes fast rising current surges. Dimming input 25 can be used to adjust potentiometer 150, changing the firing point of diac 155, thus varying lamp input voltage 84.

LED Lamp

Figure 5:
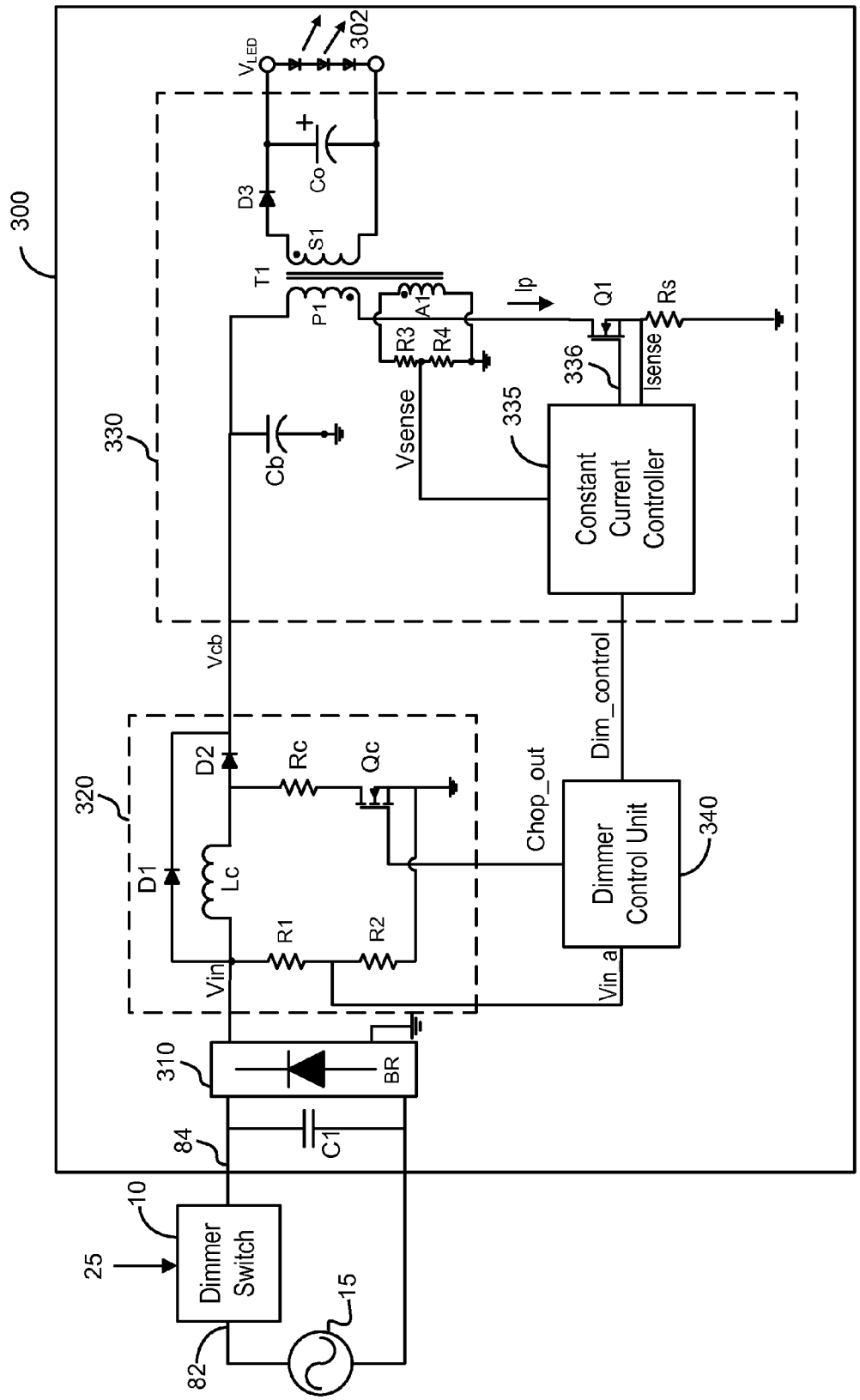
FIG. 5 illustrates an LED lamp circuit according to one embodiment of the present invention.

FIG. 5 is a detailed view illustrating an example embodiment of LED lamp 300, LED lamp 300 comprises bridge rectifier 310, chopping circuit 320, power converter circuit 330, dimmer control unit 340, and LEDs 302. LED lamp 300 also includes capacitor C1 for EMI suppression.

Bridge rectifier 310 rectifies lamp input voltage 84 from dimmer switch 10 and provides rectified voltage signal Vin to chopping circuit 320. Chopping circuit 320 is a switching circuit that supplies power to the power converter 330 as supply voltage Vcb. Chopping circuit 320 efficiently supplies power to power converter 330 according to switching control signal Chop_out that is generated based in part on the type of dimmer switch 10 detected during a configuration mode of LED lamp 300 described in further detail below. Chopping circuit 320 also outputs sense voltage Vin_a to dimmer control unit 340. During the configuration mode, dimmer control unit 340 determines the type of dimmer switch 10 based in part on the sense voltage Vin_a. During normal operation, dimmer control unit 340 outputs control signal Chop_out to control switching of chopping circuit 320, and outputs control signal Dim_control to control power converter 330. Power converter 330 drives LEDs 302 based on Dim_control to achieve the desired dimming effect as will be described in more detail below. Although only three LEDs 302 are illustrated, it should be understood that power converter 330 may drive an LED string having any number of LEDs, or may drive multiple strings of LEDs 302 in parallel.

Chopping Circuit

In one embodiment, chopping circuit 320 comprises resistors R1, R2, and Rc, inductor Lc, diodes D1 and D2, and switch Qc. Chopping inductor Lc is coupled in series between input voltage Yin and switch Qc for storing power from input voltage Vin when chopping switch Qc turns on and releasing power to the power converter when chopping switch Qc turns off. Diode D2 is coupled in series between chopping inductor Lc and power converter 330, and provides power from chopping inductor Lc to power converter 330 when switch Qc turns off. Chopping resistor Rc is coupled in series with chopping switch Qc and chopping inductor Lc and dissipates power from chopping inductor Lc when switch Qc turns on. Diode D1 is coupled between input voltage Vin and power converter 330, and charges capacitor Cb when the voltage Vcb is lower than the input lamp voltage. Resistors R1 and R2 form a voltage divider to provide sense voltage Vsense proportional to input voltage Vin.

Switch Qc is controlled by switch control signal Chop_out to turn Qc on and off in a manner that efficiently delivers supply voltage Vcb to power converter 330. As discussed above, dimmer switch 10 typically contains a triac device 64. However, triac device 64 contains a parasitic capacitance that, if not controlled, can deliver undesirable current to power converter 330 while the triac device 64 is in the off-state. Furthermore, capacitor C1 can deliver additional undesirable current to power converter 330 while triac device 64 is in the off-state. Such undesirable current could cause distortion of lamp input voltage Vin and cause LED lamp 300 to malfunction. Switch control signal Chop_out controls switch Qc in order to provide a resistive load to input voltage Yin when triac device 64 is in the off-state and dissipate the undesired current. In one embodiment, Chop_out controls Qc to turn on during a detected estimate of the off-time Td_off of the dimmer (also referred to herein as the "fire period"), thereby redirecting the undesired current through bypass resistor Rce and preventing distortion on input voltage Vin. During a detected estimate of the on-time Td_on of the dimmer (also referred to herein as the "chopping period"), Chop_out controls Qc to allow current to flow from the bridge rectifier 310 through diode D2 to the power converter 330. In one embodiment, Diode D1 charges capacitor Cb when the voltage Vcb is lower than the input lamp voltage Vin to help reduce the inrush current when triac 64 turns on.

In order to provide good power efficiency, switch control signal Chop_out controls Qc to cyclically turn on and off during the chopping period according to a chopping function rather than holding Qc in the off-state. For example, in one embodiment, the chopping period comprises multiple chopping cycles, where each chopping cycle i comprises an on-time $Ton\_Qc_i$ and off-time $Toff\_Qc_i$. In one embodiment, the on-time $Ton\_Qc_i$ of switch Qc during a chopping cycle i is given by the following equation:

$$Ton\_Qc_i = \frac{K1}{Vin_i} \qquad (1)$$

where K1 is an experimentally determined constant, and Vin is the input voltage Vin at the beginning of the chopping cycle i.

The off-time Toff_Qc$_i$ during chopping cycle i is given by the following equation:

$$\text{Toff\_Qc}_i = \frac{K2}{Vin_i} - \text{Ton\_Qc}_i \quad (2)$$

where K2 is a second experimentally determined constant. Thus, switch Qc turns on and off multiple times during the chopping period according to varying on-times and off-times that are based on the varying input voltage Vin.

Figure 6:
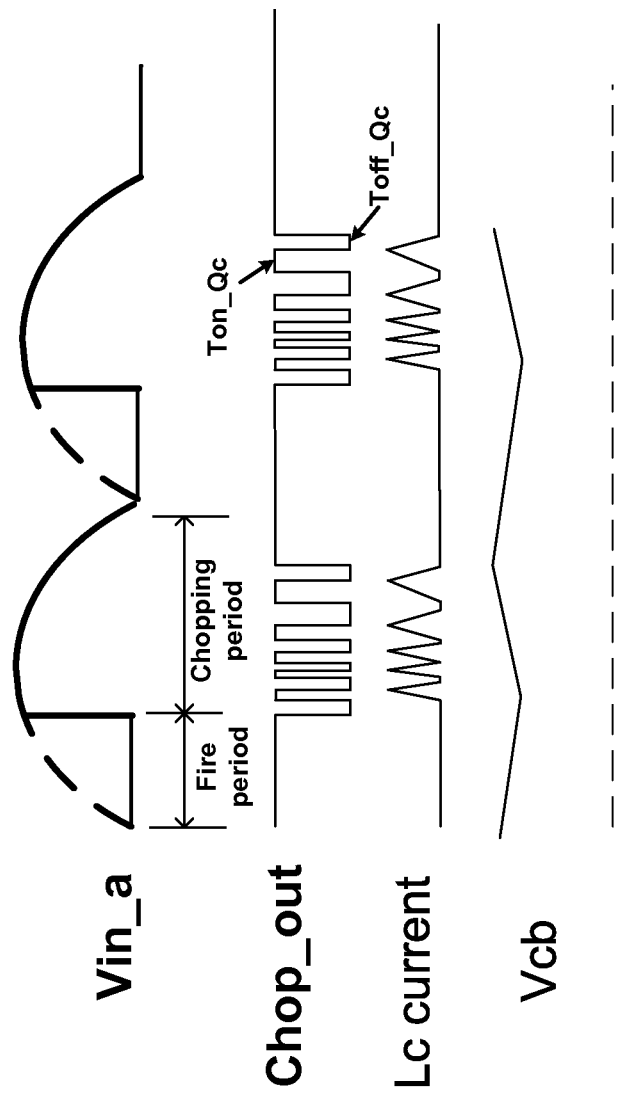
FIG. 6 illustrates waveforms showing operation of a chopping circuit, according to one embodiment of the present invention.

FIG. 6 illustrates example waveforms showing the operation of chopping circuit 320. The waveforms are illustrated with an example input Vin_a (sensed via a voltage divider comprising resistors R1 and R2) that follows a leading edge dimmer type. However, chopping circuit 320 operates similarly when other types of dimmers are present (e.g., a trailing edge dimmer). During the fire period, Chop_out is set high, turning on switch Qc. Inductor Lc is saturated and supplies constant current which is dissipated through chopping resistor Rc. Voltage Vcb drops during the fire period because no current flows through diode D2 to power converter 330.

During the chopping period, Chop_out is turned on and off according to the chopping functions of equations (1) and (2). As Vin increases, the on-period Ton_Qc$_i$ and the off-period Toff_Qc$_i$ of the control signal Chop_out both decrease. Thus, in one embodiment, both the on-period Ton_Qc$_i$ and the off-period Toff_Qc$_i$ are inversely proportional to input voltage Vin. The chopping inductor Lc stores energy when Qc turns on, and then releases the energy to capacitor Cb when Qc turns off as illustrated by the current spikes through Lc. The energy from inductor Lc charges capacitor Cb and voltage Vcb increases. During the chopping period, the average current of Lc is in phase with the input AC line voltage, inherently providing a high power factor.

Power Converter

Referring back to FIG. 5, in one embodiment, power converter 330 comprises a flyback converter that includes diode D3, capacitor Co, switch Q1, resistors R3, R4, and Rs, constant current controller 335, and transformer T1 having primary winding P1, secondary winding S1, and auxiliary winding A1. Constant current controller 335 generates output drive signal 336 that drives the switch Q1. The input power from supply voltage Vcb is stored in transformer T1 when switch Q1 is turned on because diode D3 becomes reverse biased. The input power is then transferred to LEDs 302 across capacitor Co while switch Q1 is turned off because diode D3 becomes forward biased. Diode D3 functions as an output rectifier and capacitor Co functions as an output filter. The resulting regulated output voltage V_LED is delivered to LEDs 302.

Constant current controller 335 generates switch control signal 336 to control switch Q1 of converter 330 such that a constant current is maintained through the LEDs 302. Constant current controller 335 can employ any one of a number of well-known modulation techniques, such as pulse-width-modulation (PWM) or pulse-frequency-modulation (PFM), to control the ON and OFF states and duty cycles of power switch Q1. PWM and PFM are conventional techniques used for controlling the switching power converters by controlling the widths or frequencies, respectively, of the output drive pulse 336 driving the switch Q1 to achieve output power regulation. Thus, constant current controller 335 generates appropriate switch drive pulses 336 to control the on-times of power switch Q1 and regulate the output current through the LEDs 302.

The voltage Isense is used to sense the primary current Ip through the primary winding P1 in the form of a voltage across sense resistor Rs. The voltage Vsense is used to sense the voltage across the auxiliary winding A1 of transformer T1 via a resistive voltage divider comprising resistors R3 and R4. In a flyback converter, the output current is proportional to the product of the peak voltage on the current sensing resistor Rs (represented by Isense) and the reset time of transformer T1. The reset time of the transformer T1 is the time between when switch Q1 is turned off and the falling edge of the transformer auxiliary voltage (represented by Vsense). Constant current controller 335 implements peak current switching to limit primary current Ip by sensing the voltage Isense and generating control signal 336 to turn off the switch Q1 when Isense exceeds a threshold value Vipeak. Constant current controller 335 also samples voltage Vsense at the end of each switching cycle of power converter 330 to measure the reset time of the transformer T1. Constant current regulation is maintained by adjusting the threshold value Vipeak in inverse proportion to the measured reset time of the transformer T1 in the previous cycle. An example embodiment of constant current controller 335 is described in more detail in U.S. Pat. No. 7,443,700 entitled "On-time Control for Constant Current Mode in a Flyback Power Supply", issued on Oct. 28, 2008, the content of which is hereby incorporated by reference in its entirety.

Dimmer Control Unit

Figure 7:
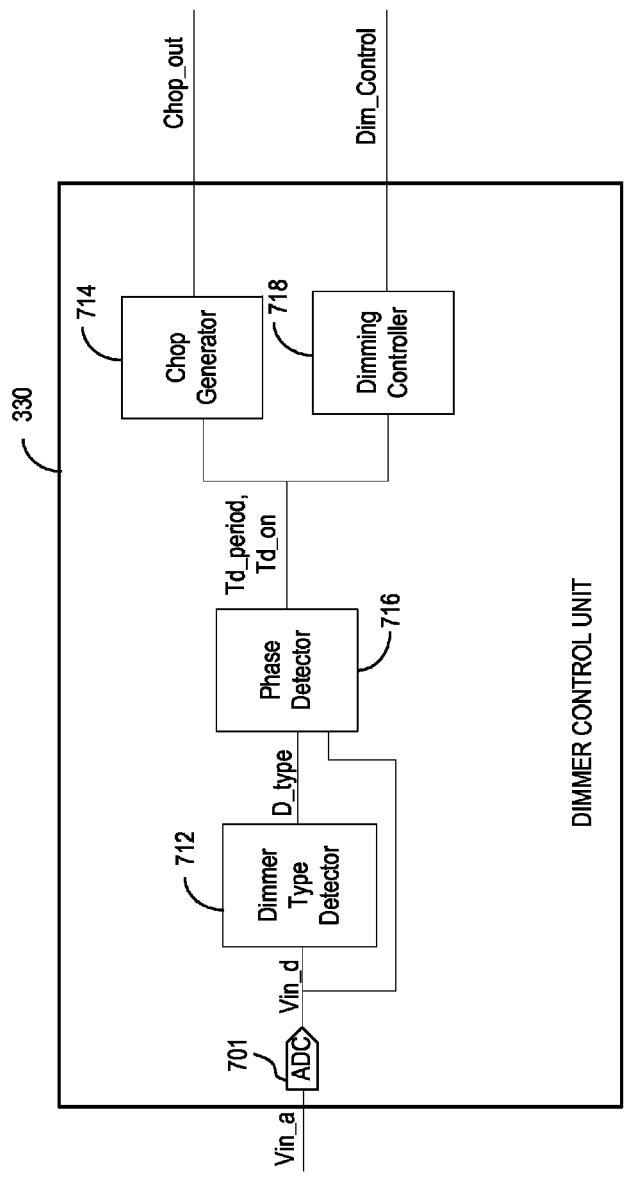
FIG. 7 illustrates a dimmer control unit, according to one embodiment of the present invention.

FIG. 7 illustrates an embodiment of dimmer control unit 340. Dimmer control unit 340 comprises analog-to-digital converter (ADC) 701, dimmer type detector 712, phase detector 716, chop generator 714, and dimming controller 718. Those of skill in the art will recognize that other embodiments can have different modules than the ones described here, and that the functionalities can be distributed among the modules in a different manner. In addition, the functions ascribed to the various modules can be performed by multiple modules.

ADC 701 receives analog signal Vin_a from chopping circuit 320 and converts the signal Vin_a to digital signal Vin_d. As described above, input signal Vin_a (and corresponding digital signal Vin_d) is proportional to lamp input voltage Vin. Dimmer type detector 712 determines the type of dimmer (indicated by D_type) during a configuration process as will be described in further detail below with reference to FIGS. 8-9. Phase detector 716 observes input signal Vin_d and determines the amount of phase modulation (if any) using detection algorithms based on D_type. Phase detector 716 outputs a detected period Td_period and detected on-time Td_on of the dimmer switch 10. Td_period and Td_on are used by chop generator 714 to generate chopping control signal Chop_out to control switching of chopping circuit 320. Td_period and Td_on are also used by dimming controller 718 to generate control signal Dim_control, which is outputted to power converter 330 to achieve the desired dimming effect.

Configuration Process for Dimmer Type Detection

Figure 8:
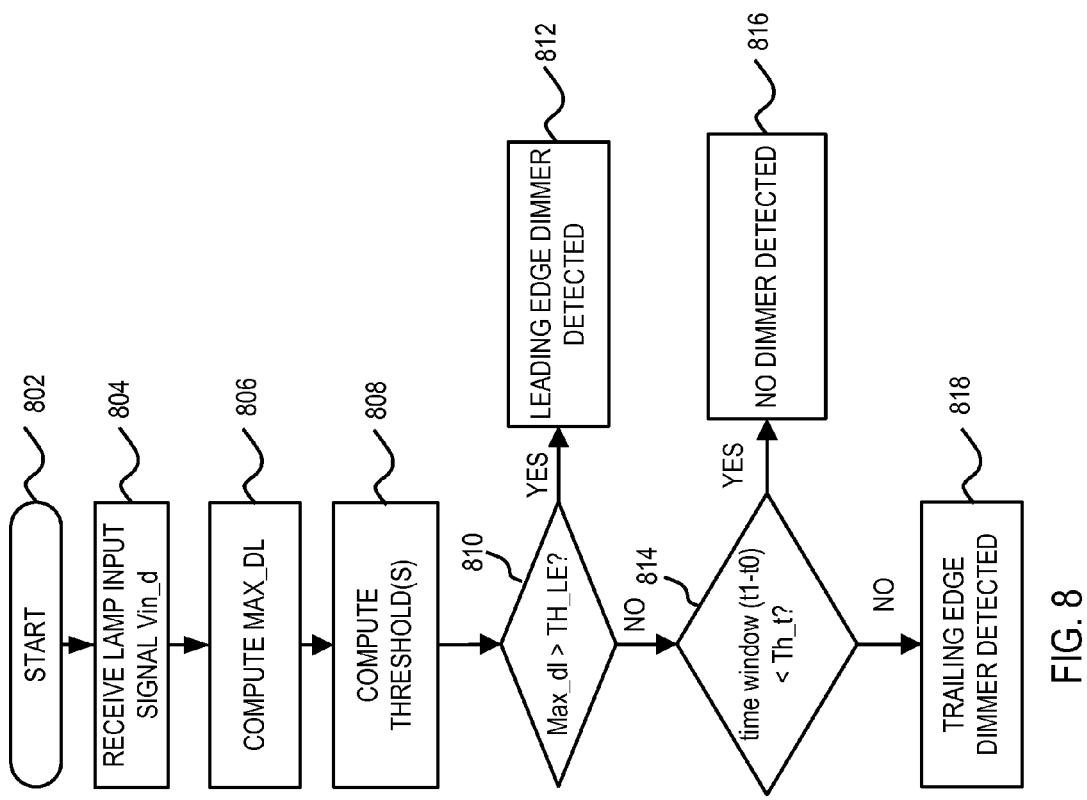
FIG. 8 is a flowchart illustrating a process for detecting a dimmer type, according to one embodiment of the present invention.

An example process performed by dimmer control unit 712 for determining the type of dimmer switch 10 is illustrated in FIG. 8. Typically, the detection process starts 802 during a predefined configuration period of LED lamp 300. The configuration period generally begins shortly after the AC power source 15 is turned on, but after enough cycles have passed so that the process is not affected by start-up noise (e.g., during the 3rd AC half-cycle after start-up). Dimmer type detector 712 receives 804 digital signal Vin_d. Dimmer type detector 712 then computes a derivative of Vin_d and determines 806 the maximum positive derivate Max_dl that occurs during an AC cycle. In some embodiments, dimmer type detector 712 determines the minimum derivative Min_dl that occurs during the AC cycle instead of or in addition to Max_dl.

Dimmer type detector 712 computes 808 one or more adaptive threshold values as a function of the maximum input voltage detected during the previous AC cycle (Vin_max). For example, in one embodiment, the adaptive threshold value is directly proportional to Vin_max. In other alternative embodiments, the thresholds are instead computed as a function of the minimum filtered derivative Min_dl.

To detect a leading edge dimmer, dimmer type detector 712 compares 810 Max_dl to a leading edge threshold Th_LE. Leading edge threshold Th_LE is set such that Max_dl will exceed the threshold Th_LE when a leading-edge dimmer turns on (due to the very steep leading voltage that occurs when a leading edge dimmer turns on), but Max_dl will not exceed the threshold Th_LE when no dimmer is present or when a trailing edge dimmer is present (due to the more gradual leading voltage of the un-modulated AC cycle). If Max_dl exceeds the threshold Th_LE, dimmer type detector 712 determines 812 that a leading edge dimmer is detected.

If the threshold Th_LE is not exceeded, dimmer type detector 712 next determines if a trailing edge dimmer is supplying input voltage Vin or if there is no dimmer switch 10 installed. In one embodiment, dimmer type detector 712 measures a time period between a time t0 and a time t1, where t0 corresponds to a time when Vin_d falls below a trailing edge threshold voltage Th_TE, and t1 corresponds to a time when Vin_d rises above the trailing edge threshold voltage Th_TE. Dimmer type detector 712 then determines 814 if the measured time period (t1−t0) is less than a time threshold Th_t. If the measured time window (t1−t0) fails to exceed the time threshold Th_t, then dimmer type detector 712 determines 816 that no dimmer switch is present. Otherwise, if the measured time window (t1−t0) exceeds the time threshold Th_t, then dimmer type detector 712 determines 818 that a trailing edge dimmer is detected. This detection technique relies on the fact that the output voltage of a trailing edge dimmer drops to near zero prior to the completion of the AC half-cycle, and thus the input voltage Vin_d will remain below the threshold voltage Th_TE for a longer period of time (t1−t0) when a trailing edge dimmer switch is installed than when there no dimmer switch is installed.

Figure 9:
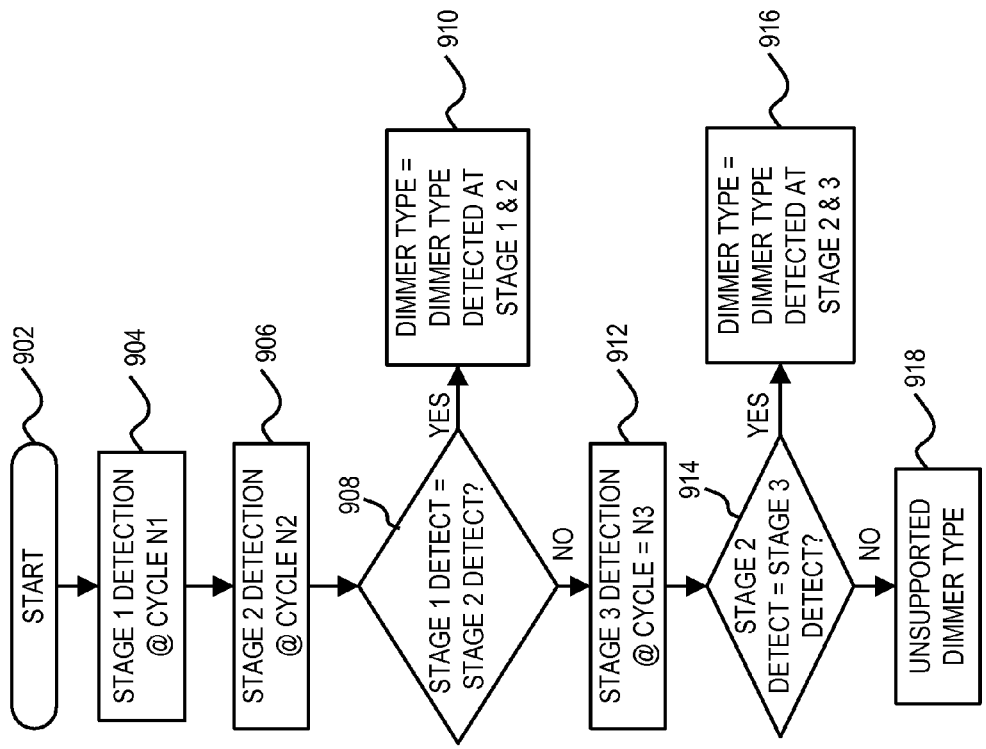
FIG. 9 is a flowchart illustrating a multi-stage process for detecting and re-detecting a dimmer type, according to one embodiment of the present invention.

Some dimmers require a warm-up period before they are able to output a proper leading-edge or trailing-edge voltage waveform. To support these dimmers, in some embodiments, dimmer type detector 712 runs one or more dimmer re-detection processes after the initial configuration period. FIG. 9 illustrates an example of a process for dimmer detection using dimmer re-detection. The process starts 902 shortly after startup of the AC power supply 15. At AC half-cycle N1 (e.g., N1=3), dimmer type detector 712 performs 904 a first dimmer detection process (i.e. stage 1 detection) such as the process described above with reference to FIG. 8. At AC half-cycle N2 (e.g., N2=20), dimmer type detector 712 performs 906 a second dimmer detection process (i.e. stage 2 detection) identical to the stage 1 detection process. Dimmer type detector 712 then compares 908 the results of the stage 1 and stage 2 detections. If the stage 1 and stage 2 detection processes agree on the detected dimmer type, then the dimmer type determined by stage 1 and stage 2 is confirmed and the output D_type is set 910 to the agreed upon dimmer type. If the results disagree, dimmer type detector 712 performs 912 a third detection process (i.e. stage 3 detection) at AC half-cycle N3 (e.g., N3=30). Dimmer type detector 712 then compares 914 the results of the stage 2 and stage 3 detections. If the detection processes agree, then the dimmer type determined by stage 2 and stage 3 is confirmed and the output D_type is set 916 to the agreed upon dimmer type. If the results disagree, then dimmer type detector 712 determines that an unsupported dimmer type is used and sets 918 the output D_type accordingly.

In one embodiment, LED lamp 300 enters a "safe mode" when dimmer type detector 712 determines that the dimmer type is unsupported. In "safe mode," the LED lamp 300 may prevent the delivery of power to the LEDs 302. In one embodiment, the LED lamp 300 outputs a coded signal (e.g., in a form of a blinking pattern) to assist an end user in determining the proper course of action when an unsupported dimmer type is detected.

Phase Detection

Referring back to FIG. 7, Phase detector 716 determines an amount of phase modulation applied by the dimmer switch 10 based in part on the determined dimmer type D_type. For example, in one embodiment, phase detector 716 determines a detected period Td_period and detected on-time Td_on of the dimmer. Example waveforms showing phase detection are illustrated in FIG. 10A for a leading edge dimmer type and in FIG. 103 for a trailing edge dimmer type. In one embodiment, phase detector 716 comprises a comparator for comparing input voltage Vin_d to threshold values dependent on D_type. Generally, the period Td_period starts when a leading portion of the input voltage Vin_d crosses a leading threshold voltage V_Le and ends at the point where a leading portion of the input voltage Vin_d again crosses the leading threshold voltage V_Le. The dimmer on-time Td_on begins at the point where a leading portion of the input voltage Vin_d crosses the leading threshold voltage V_Le and ends at the point where a trailing portion of the input voltage crosses a trailing threshold voltage V_Tr. The dimmer off-time is given as follows:

$$T_{d\_off} = T_{d\_period} - T_{d\_on} \quad (3)$$

When D_type indicates that no dimmer is present, only the leading threshold comparison is needed because the waveform is always on (i.e. Td_on=Tperiod). The thresholds voltages V_Le and V_Tr are set based on the type of dimmer detected. When no dimmer is present, the threshold voltage V_Le is a function of the maximum voltage of the previous cycle given as follows:

$$V_{Le} = K_3 \cdot V_{in\_max}, V_r = K_3 \cdot V_{in\_max} \quad (4)$$

where K3 is an experimentally determined constant. When a dimmer is present (leading edge or trailing edge), the leading and trailing threshold voltages are fixed values (e.g., V_Le=53 V and V_Tr=26V). Furthermore, in one embodiment, phase detector 716 comprises a low pass filter. When a leading-edge dimmer is detected, the filter is bypassed and an unfiltered input voltage Vin_d is compared to the leading threshold V_Le. In all other cases, a low-pass filtered input voltage is used for threshold comparisons.

Chop generator 714 generates Chop_out signal described above using the detected dimmer on-time Td_on and off-time Td_off. Generally, chop generator 714 outputs Chop_out to turn transistor Qc on during the detected off-time Td_off of the dimmer, and switches Qc on and off according to a chopping function during the detected on-time Td_on of the dimmer, as described above with respect to equations (1) and (2).

Dimming controller 718 uses the detected dimmer on-time Td_on and off-time Td_off to generate dimmer control signal Dim Control. In one embodiment, dimming controller 718 compute a dimming phase Dphase as follows:

$$D_{phase} = \frac{T_{ON}}{T_{PERIOD}} \quad (5)$$

Dimming controller 718 then converts the dimming phase Dphase to an LED dimming ratio D_ratio in the range [0, 1] indicating a fraction of power to deliver to the LEDs to achieve the desired dimming. Thus, when D_ratio=1, the power convert 330 outputs 100% of power to the LEDs 302. When D_ratio=0.1, the power converter 330 outputs 10% of power to the LEDs 302. In one embodiment, the LED dimming ratio D_ratio is computed as follows:

$$D_{ratio} = D_{phase} \cdot K_4 + K_5 \quad (6)$$

where K4 and K5 are experimentally determined constants based on the different luminosity curves between incandescent bulbs and LEDs. The constants K4 and K5 are chosen such that the LED lamp 300 will behave like art incandescent lamp in its luminosity response to the dimming control signal 25. Thus, for example, if the dimmer switch 10 is set to 50% dimming, the LED lamp 300 will control current through the LEDs 302 such that the LEDs output 50% of their maximum output luminosity.

Two different approaches may be used to modulate output power of the LEDs 302. In the first approach, PWM digital dimming is used, and Dim_control is indicative of a duty cycle used by power converter 330 to achieve the desired dimming effect. In PWM dimming, the desired dimming effect is achieved by switching the LEDs 302 on and off according to a duty cycle based on the desired dimming. The perceived light intensity of the LEDs 302 is dictated by the average intensity output. In one embodiment, power converter 330 achieves the desired dimming effect by switching between a constant current state and an off-state. In the constant current state (i.e. the On_period), constant current controller 335 turns switch Q1 on and off as described above such that a constant current is maintained through LEDs 302 and the LEDs are on. In the off-state (i.e. the Off_period), constant current controller 335 turns switch Q1 off and the LEDs 302 turn off. The On_period (during which converter 330 operates in the constant current state) is given by:

$$\text{On\_period} = D\_ratio \cdot \text{Dimming\_period} \quad (7)$$

where Dimming_period is a nominal value corresponding to maximum allowed dimming period. In the off-state, the LEDs turn off for an off-period given by:

$$\text{Off\_period} = \text{Dimming\_period} - \text{On\_period} \quad (8)$$

In a second approach, output power of the LEDs 302 is modulated using amplitude dimming. In amplitude dimming, the desired dimming effect is achieved by lowering the peak current through the primary side winding, which proportionally lowers the output current of the power converter 330. Thus, control signal Dim_control is indicative of a peak current used by the power converter 330 to achieve the desired dimming effect. In this approach, the threshold signal Vipeak used by the constant current controller 335 for current regulation is modulated as:

$$\text{Vipeak} = \text{Vipeak\_nom} \times D\text{ratio} \quad (8)$$

where Vipeak_nom is a nominal threshold value proportional to the maximum allowable LED current. As explained above, constant current controller 335 compares the sensed voltage Isense to Vipeak and switches Q1 off when Isense exceeds Vipeak. Thus, the dimming effect is achieved by scaling down the peak current allowed through the primary side winding.

Generally, the PWM dimming approach has the advantage of high efficiency, but can have the problem of flicker. The amplitude dimming approach does not have the flicker problem, but instead can have lower efficiency relative to the PWM dimming approach and has a more limited dimming range. In one embodiment, a hybrid dimming approach is therefore used to obtain the best combination of efficiency and performance. In the hybrid dimming approach, dimming controller 718 outputs control signal Dim_control comprising a first control signal indicating a modified duty cycle (represented by On_period) and a second control signal indicating a modified peak current value (Vipeak) for controlling power converter 330. In this embodiment, both On_period and Vipeak are modulated as a function of D_ratio as follows:

$$\text{On\_period} = f_1(D\_ratio)$$

$$\text{Vipeak} = f_2(D\_ratio) \quad (9)$$

where functions f1 and f2 are experimentally determined functions.

The LED lamps according to various embodiments of the present invention has the advantage that the LED lamp can be a direct replacement of conventional incandescent lamps in typical wiring configurations found in residential and commercial building lighting applications, and that the LED lamp can be used with conventional dimmer switches that carry out dimming by changing the input voltage to the lamps.

Upon reading this disclosure, those of skill in the art will appreciate still additional alternative designs for an LED lamp. Thus, while particular embodiments and applications of the present invention have been illustrated and described, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. A light-emitting diode (LED) lamp controller, comprising:
a dimmer control unit configured to determine a characteristic of an input voltage and identity a type of dimmer switch providing the input voltage based on the determined characteristic of the input voltage, determine a detected dimming amount of the input voltage for the identified type of dimmer switch, and generate one or more control signals to control regulated current through one or more LEDs such that an output light intensity of the one or more LEDs corresponds to the detected dimming amount, wherein the dimmer control unit comprises:
a phase detector configured to receive the input voltage and determine a detected phase angle modulation of the input voltage representative of the detected dimming amount by comparing the input voltage to one or more threshold voltages that are set differently depending on the identified type of dimmer switch; and
a dimming controller configured to generate the one or more control signals using the detected amount of phase angle modulation to control dimming of the one or more LEDs; and
a power converter configured to receive the control signals and provide regulated current to the one or more LEDs, the power converter configured to adjust the regulated current to the one or more LEDs as indicated by the one or more control signals to achieve the output light intensity.

2. The LED lamp controller of claim 1, wherein the phase detector comprises:
a comparator for comparing the input voltage to a leading threshold to determine a start of a detected on-time, and for comparing the input voltage to a trailing threshold to determine an end of the detected on-time,
wherein the amount of phase angle modulation is determined from the detected on-time, and wherein the leading threshold and the trailing threshold are set based on the detected type of dimmer switch.

3. The LED lamp controller of claim 2, wherein the leading threshold is a function of a maximum voltage of a previous cycle when the dimmer type detector determines that no dimmer switch is present, and wherein the leading threshold is a fixed value when the dimmer type detector determines that a leading edge dimmer or a falling edge dimmer is detected.

4. The LED lamp controller of claim 2, wherein the phase detector comprises:
a low-pass filter for filtering the input voltage prior to comparing the input voltage to the leading threshold when the detected type of dimmer switch is a trailing edge dimmer or when no dimmer is present, and wherein the low pass filter is bypassed when the detected type of dimmer switch is a leading edge dimmer.

5. The LED lamp controller of claim 1, wherein the one or more dimmer control signals
comprise:
a peak current control signal indicative of a peak current for driving the one or more LEDs, wherein the peak current is a function of the determined characteristic of the input voltage,
wherein the power converter drives the one or more LEDs in a constant current mode that limits current through the one or more LEDs to the peak current.

6. The LED lamp controller of claim 1, wherein the one or more dimmer control signals
comprise:
a duty cycle control signal indicative of a duty cycle for driving the one or more LEDs, wherein the duty cycle is a function of the determined characteristic of the input voltage;
wherein the power converter turns the one or more LEDs on during an on-period of the duty cycle and the power converter turns the one or more LEDs off during an off-period of the duty cycle.

7. The LED lamp controller of claim 1, further comprising a chopping circuit configured
to dissipate power from the input voltage during a detected off-time of the input voltage, and cycle between dissipating power from the input voltage and providing power from the input voltage to the power converter during a detected on-time of the input voltage.

8. The LED lamp controller of claim 7, wherein the dimmer control unit further comprises:
a chop generator circuit configured to generate a chopping control signal for controlling switching of the chopping circuit such that the chopping circuit provides power from the input voltage to the power converter during a chopping on-time inversely proportional to the input voltage, and dissipates power from the input voltage during a chopping off-time inversely proportional to the input voltage.

9. The LED lamp controller of claim 7, wherein the chopping circuit comprises:
a chopping switch;
a chopping inductor coupled in series between the input voltage and the chopping switch, the chopping inductor for storing power from the input voltage when the chopping switch turns on and releasing power when the chopping switch turns off;
a chopping diode coupled in series between the chopping inductor and the power converter, the chopping diode for providing power from the chopping inductor to the power converter when the chopping switch turns on; and
a chopping resistor coupled in series with the chopping switch and the chopping inductor, the chopping resistor for dissipating power from the chopping inductor when the chopping switch turns on.

10. A method for dimming an LED lamp, the method comprising:
receiving a lamp input voltage;
performing a first dimmer detection stage to determine a characteristic of the lamp input voltage and identify a type of dimmer switch outputting the lamp input voltage based on the determined characteristic;
determining a detected dimming amount of the lamp input voltage for the identified type of dimmer switch, wherein determining the detected dimming amount comprises determining a detected phase angle modulation of the lamp input voltage representative of the detected dimming amount by comparing the lamp input voltage to one or more threshold voltages that are set different depending on the detected type of dimmer switch;
determining one or more control signals to drive the LED lamp based on the lamp input voltage and the detected dimming amount; and
driving the LED lamp based on the one or more control signals such that output light intensity of the LED lamp corresponds to the detected dimming amount.

11. The method of claim 10, wherein performing the first dimmer detection stage comprises:
computing a first function of the lamp input voltage during a previous cycle of the lamp input voltage;
computing a first threshold value;
determining if the first function has a first predetermined relationship with the first threshold value; and
responsive to the first function having the first predetermined relationship with the first threshold value, determining that the lamp input voltage is outputted from a leading edge dimmer switch.

12. The method of claim 11, further comprising:
computing a second threshold value;
determining a second function of the lamp input voltage; and
responsive to the second function of the lamp input voltage having a second predetermined relationship with the second threshold value, determining that the lamp input voltage is outputted from a trailing edge dimmer switch.

13. The method of claim 10, further comprising:
performing a second dimmer detection stage a first number of cycles after the first dimmer detection stage;
responsive to the determined dimmer type in the first dimmer detection stage not matching the determined dimmer type in the second dimmer detection stage, performing a third dimmer detection stage a second number of cycles after the second dimmer detection stage;
responsive to the determined dimmer type in the second dimmer detection stage matching the determined dimmer type in the third dimmer detection stage using the determined dimmer type in the second or third detection stage as the detected type of dimmer; and responsive to the determined dimmer type in the second dimmer detection stage not matching the determined dimmer type in the third dimmer detection stage, outputting a signal indicative of an unsupported dimmer type.

14. The method of claim 10, wherein determining the detected phase angle modulation of the lamp input voltage comprises:

determining a leading threshold and a trailing threshold based at least in part on the detected type of dimmer switch;

comparing the lamp input voltage to the leading threshold to determine a start of a detected on-time of the dimmer switch;

comparing the lamp input voltage to a trailing threshold to determine an end of the detected on-time of the dimmer switch;

determining a period of the lamp input voltage by determining a time between two consecutive starts of the detected on-time; and determining the detected phase angle modulation of the lamp input voltage as a ratio of the on-time and the period of the dimmer switch.

15. The method of claim 14, further comprising:

applying a low-pass filter to the lamp input voltage prior to comparing the lamp input voltage to the leading threshold responsive to the detected type of dimmer switch being a trailing edge dimmer or responsive to detecting that no dimmer is present; and bypassing the low-pass filter responsive to the detected type of dimmer switch being a leading edge dimmer.

16. The method of claim 14, wherein determining the leading threshold comprises;

setting the leading threshold to a function of a maximum voltage of a previous cycle when no dimmer switch is present; and setting the leading threshold to a fixed value when a leading edge dimmer or a falling edge dimmer is detected.

17. The method of claim 10, wherein the determining the one or more control signals comprises:

determining a peak current as function of the detected dimming amount, wherein the LED lamp operates in a constant current mode that limits current through the LED lamp to the peak current.

18. The method of claim 10, wherein determining the one or more control signals comprises:

determining a duty cycle as a function of the detected dimming amount, wherein the LED lamp turns on during an on-period of the duty cycle and the LED lamp turns off during an off-period of the duty cycle.

19. The method of claim 10, further comprising:

dissipating power from the lamp input voltage during a detected off-time of the lamp input voltage, and cycling between dissipating power from the lamp input voltage and providing power from the lamp input voltage to a power converter of the LED lamp during a detected on-time of the lamp input voltage.

20. The method of claim 19, wherein cycling between dissipating power from the lamp input voltage and providing power from the lamp input voltage to a power converter comprises:

providing power from the lamp input voltage to the power converter during a chopping on-time inversely related to the lamp input voltage; and dissipating power from the lamp input voltage during a chopping off-time inversely related to the lamp input voltage.

21. A light-emitting diode (LED) lamp controller, comprising:

a dimmer control unit configured to determine a characteristic of an input voltage, determine if a dimmer is present in an LED lamp system based on the characteristic of the input voltage, and determine a type of dimmer providing the input voltage if the dimmer is present, the dimmer control unit further configured to determine a detected dimming amount of the input voltage if the dimmer is present, and generate one or more control signals to control regulated current through one or more LEDs, the one or more control signals further controlling the regulated current such that an output light intensity of the one or more LEDs corresponds to the detected dimming amount if the dimmer is present, wherein the one or more control signals comprises a duty cycle control signal indicative of a duty cycle for driving the one or more LEDs, wherein the duty cycle is a function of the determined characteristic of the input voltage; and a power converter configured to receive the control signals and provide regulated current to the one or more LEDs, the power converter configured to adjust the regulated current to the one or more LEDs as indicated by the one or more control signals, wherein the power converter turns the one or more LEDs on during an on-period of the duty cycle and the power converter turns the one or more LEDs off during an off-period of the duty cycle.

22. The LED lamp controller of claim 21, wherein the one or more dimmer control signals comprise:

a peak current control signal indicative of a peak current for driving the one or more LEDs, wherein the peak current is a function of the determined characteristic of the input voltage, wherein the power converter drives the one or more LEDs in a constant current mode that limits current through the converter to the peak current.

23. A method for controlling an LED lamp in an LED lamp system, the method comprising:

receiving an input voltage;

performing a first dimmer detection stage to determine if a dimmer is present in the LED lamp system and to determine a type of dimmer providing the input voltage if the dimmer is present, wherein performing the first dimmer detection stage comprises:

determining a characteristic of the input voltage; and responsive to determining that the determined characteristic of the input voltage fails to meet that of a leading edge dimmer or a trailing edge dimmer, determining that the dimmer is not present;

determining a detecting dimming amount of the lamp input voltage for the detected type of dimmer if the dimmer is present;

determining one or more control signals to drive the LED lamp based on the input voltage and based on the detected dimming amount if the dimmer is present; and driving the LED lamp based on the one or more control signals.

24. The method of claim 23, wherein performing the first dimmer detection stage comprises:

determining a first function of the lamp input voltage during a previous cycle of the input voltage;

determining a first threshold value;

comparing the first function of the input voltage to the first threshold value; and responsive to the first function of the input voltage having a first predetermined relationship with the first threshold value, determining that the dimmer is present and that the dimmer is a leading edge type of dimmer.

25. The method of claim 24, wherein performing the first dimmer detection stage comprises:

computing a second threshold value;

determining a second function of the input voltage; and comparing the second function of the input voltage to the second threshold value; and responsive to the second function of the input voltage having a second predetermined relationship with the second threshold value, determining that the dimmer is present and that the input voltage is outputted from a trailing edge type of dimmer switch.

* * * * *